United States Patent [19]

Nishizawa

[11] Patent Number: 5,431,102
[45] Date of Patent: Jul. 11, 1995

[54] MECHANICAL ACCELERATION SENSOR
[75] Inventor: Muneo Nishizawa, Shiga, Japan
[73] Assignee: Takata Corporation, Tokyo, Japan
[21] Appl. No.: 182,591
[22] Filed: Jan. 18, 1994
[30] Foreign Application Priority Data
  Jan. 22, 1993 [JP] Japan .................. 5-025959
[51] Int. Cl.⁶ .................... F42C 1/04; B60R 21/32
[52] U.S. Cl. .................... 102/252; 102/274; 280/734; 280/806
[58] Field of Search .............. 102/216, 252, 274, 530; 280/734, 806

[56] References Cited
U.S. PATENT DOCUMENTS

| | | | |
|---|---|---|---|
| 4,204,703 | 5/1980 | Okada | 280/734 |
| 4,889,068 | 12/1989 | Tabata et al. | 116/203 |
| 4,938,140 | 7/1990 | Kinoshita et al. | 102/274 |
| 4,955,638 | 9/1990 | Kinoshita et al. | 280/806 |
| 5,163,709 | 11/1992 | Mori | 280/806 |
| 5,193,407 | 3/1993 | Sakamoto et al. | 74/2 |

Primary Examiner—Charles T. Jordan
Assistant Examiner—Theresa M. Wesson
Attorney, Agent, or Firm—Brumbaugh, Graves, Donohue & Raymond

[57] ABSTRACT

A mechanical acceleration sensor includes a sensor casing, a weight, a spring-loaded firing pin, and a latch lever, the weight, the firing pin, and the latch lever, each being movably mounted in the sensor casing in such a manner as to either translate along an axis or to rotate about an axis, the axes of translation of the members that translate being substantially perpendicular to that the axes of rotation of the members that rotate. The latch lever is loaded with a set load to engage the firing pin and is positioned to be engaged by the weight upon inertial movement of the weight to disengage from the firing pin, thereby allowing the firing pin to perform a percussive firing action by the spring load. The casing has an opening for receiving the weight, firing pin and latch lever, and shaft support grooves are provided in the casing such that each shaft support groove is open at an end thereof which faces the opening. A shaft for a member that rotates is supported by the shaft support grooves.

3 Claims, 4 Drawing Sheets

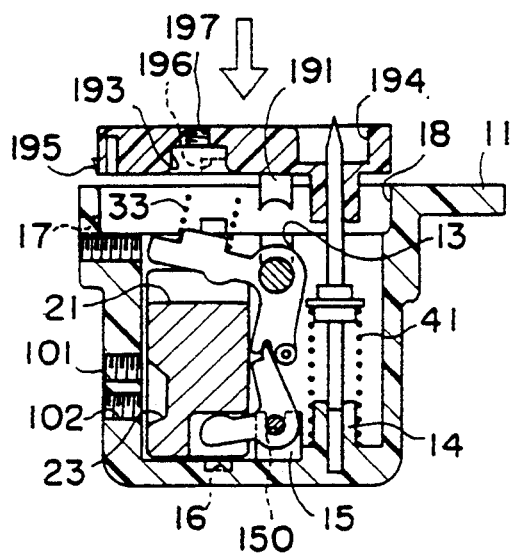
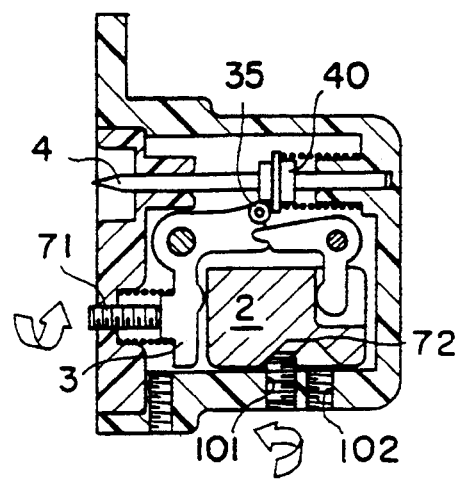
FIG. 4A                FIG. 4B
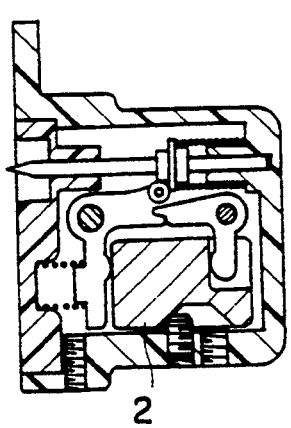
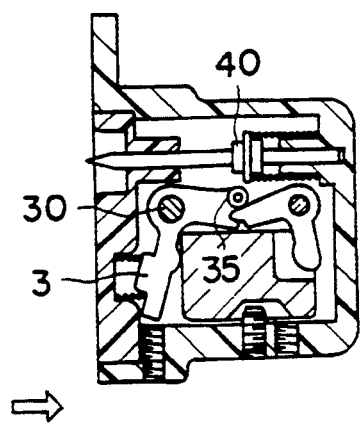
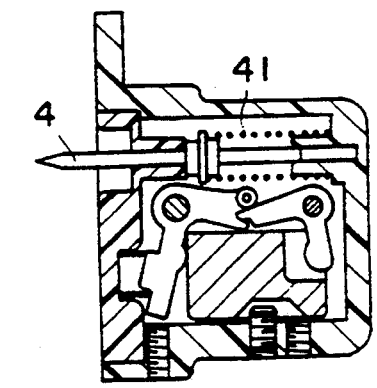
FIG. 5A        FIG. 5B        FIG. 5C

MECHANICAL ACCELERATION SENSOR

BACKGROUND OF THE INVENTION

The present invention relates to a mechanical acceleration sensor for activating a gas generator of an inflator in an air bag system or a pretensioner in a seat belt system.

Vehicles, for example, automobiles, are often provided with an air bag system or a seat belt system or both. For an inflator in the air bag system or a pretensioner in the seat belt system, a gas generator is employed as a device of generating a driving medium for the inflator or the pretensioner. Such a gas generator is activated by an acceleration sensor. As an acceleration sensor, a sensor that outputs an electric signal has heretofore commonly been used because this type of sensor is superior in acceleration pulse discriminating ability and hence advantageous in that an erroneous operation is unlikely to occur. However, electrical sensors have the disadvantage of having limitations on the locations of installation, because they require a power supply and electrical connection. Accordingly, various proposals have heretofore been made with regard to a mechanical sensor, which needs no electric supply or electrical connection, can be located in places where it is difficult and costly to install an electrical sensor, and can be constructed at a relatively low cost.

One form of mechanical sensor, which is disclosed in U.S. Pat. No. 4,955,638 has a weight, a trigger lever and a firing pin, which are movably supported in a sensor casing. When a predetermined level of acceleration occurs and acts on the weight, the trigger lever is activated by inertial movement of the weight, causing the spring-loaded firing pin to perform a percussive action, thereby firing a percussion cap attached to a gas generator.

In the mechanical sensors which have heretofore been proposed, including the above-described sensor, various studies have been pursued with regard to the sensor function. However, insufficient consideration has been given comprehensively to such matters as simplification of the arrangement, reduction in the number of parts required, and improvements in the manufacturing and assembling procedures.

SUMMARY OF THE INVENTION

The present invention has been made in view of the above-described circumstances, and it is an object of the present invention to provide a mechanical acceleration sensor which is designed so that it is possible to reduce the number of machining steps required to form a sensor casing and to facilitate incorporation of constituent elements into the sensor casing by mainly improving the support structure of each element with respect to the casing. The weight, the firing pin, and the latch lever are each movably mounted in the sensor casing in such a manner as to either translate along an axis or to rotate about an axis, the axes of translation of the members that translate being substantially perpendicular to that the axes of rotation of the members that rotate. The latch lever is moved against the set load by inertial movement of the weight to disengage from the firing pin, thereby allowing the firing pin to perform a percussive firing action by the spring load. The casing is provided with an opening to allow the weight, the firing pin and the latch lever to pass therethrough when these elements are incorporated into the casing. The casing is also provided with shaft support grooves each of which is open at an end thereof that faces the opening. A shaft that forms the axis of rotation for one of the members is supported by the shaft support grooves.

In the mechanical acceleration sensor of the present invention, the weight, the firing pin, and the latch lever are incorporated into the sensor casing through the opening provided in the casing, thereby allowing a rotary element among the above-described elements to be disposed in position so as to be rotatable about an axis with the shaft thereof fitted in the shaft support grooves.

According to the present invention, the elements which are to be disposed in the casing can be inserted into the casing through the opening provided at one end of the casing, together with the support shafts for these elements. Therefore, the position of the casing need not be changed in order to incorporate the parts into it. Thus, it is possible to simplify the assembling process. In addition, since the support shaft for each rotary element is fitted into and supported by the shaft support grooves which are open at one end thereof that faces the opening, it becomes unnecessary to form a support hole in the casing in a direction intersecting it. Thus, it is possible to reduce the number of machining steps required to form the sensor casing.

BRIEF DESCRIPTION OF THE DRAWINGS

FIGS. 4A and 4B are side cross-sectional views schematically showing assembling and setting procedures for the mechanical acceleration sensor of the embodiment.

FIGS. 5A, 5B, and 5C are side cross-sectional views schematically showing the operation of the sensor of the embodiment.

DESCRIPTION OF THE EMBODIMENT

Figure 1:
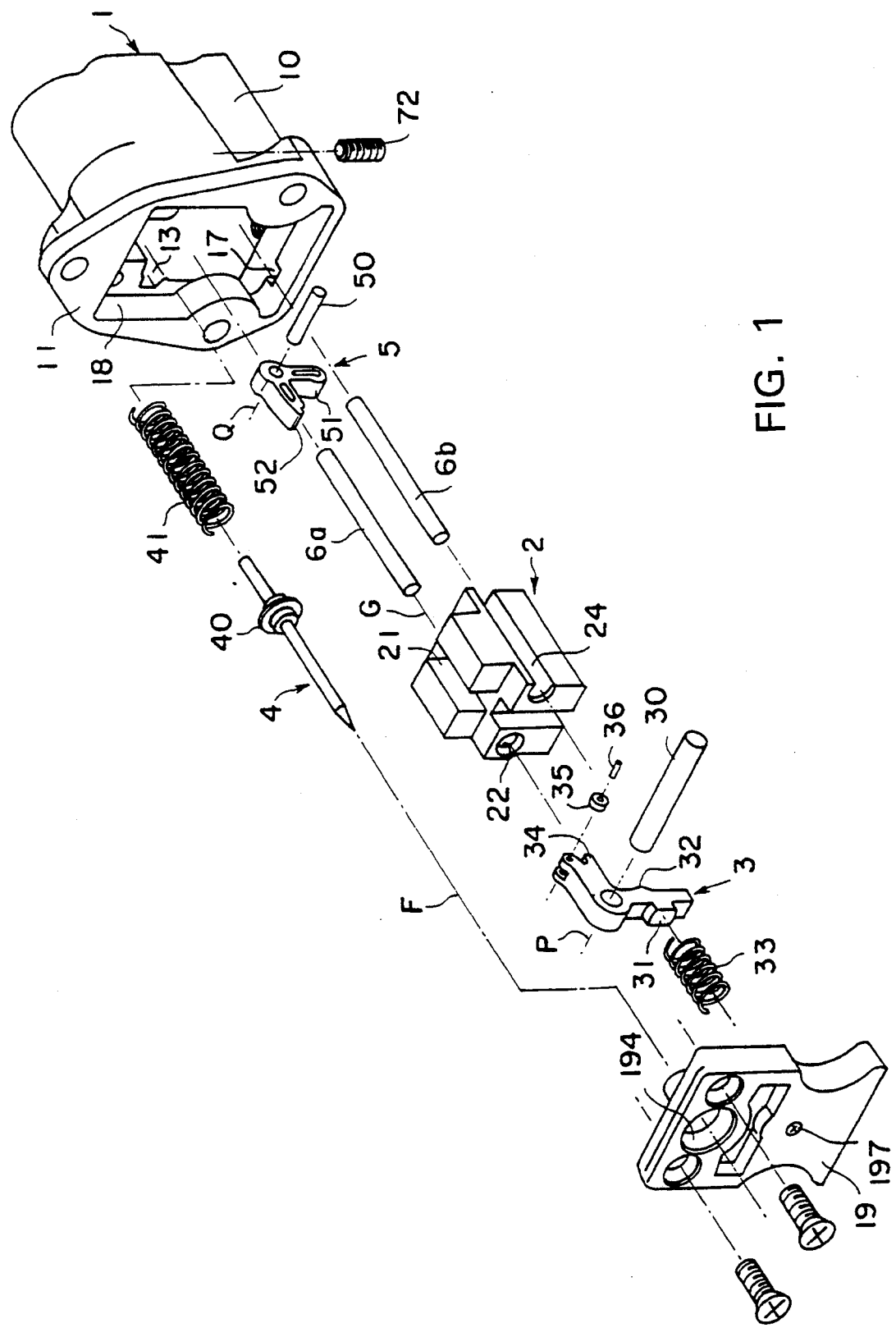
FIG. 1 is an exploded perspective view showing one embodiment of the mechanical acceleration sensor according to the present invention.

An embodiment of the present invention, which is suitable for percussively activating a percussion cap of a gas generator constituting a power source of a pretensioner, will be described below with reference to the accompanying drawings. As shown in the exploded perspective view of FIG. 1, the mechanical acceleration sensor (referred to simply as "sensor" in the following description of the embodiment) has a sensor casing 1, a weight 2, a firing pin 4 spring-loaded by a firing spring 41, and a latch lever 3 which is loaded with a set load by a set spring 33 to engage the firing pin 4 through a roller 35 supported by a pin 36 and which is disposed to face the weight 2. The weight 2, the firing pin 4, and the latch lever 3 are movably disposed in the sensor casing 1 in such a manner that the axes F and G of movement of the firing pin 4 and the weight 2 are parallel to each other and the axis P of rotation of the latch lever 3 is substantially perpendicular to the axes F and G. In operation, the latch lever 3 is rotated against the set load by inertial movement of the weight 2 to disengage from the firing pin 4, thereby allowing the firing pin 4 to perform a percussive firing action by the spring load.

In the embodiment, a sub-lever 5 is provided in connection with the latch lever 3. The sub-lever 5 is disposed to face a side of the weight 2 which is opposite to the side thereof that faces the latch lever 3 such that the sub-lever 5 is rotatable about the axis Q. Accordingly, the sub-lever 5 cooperates with the latch lever 3 to clamp the weight 2 from both sides of the direction of inertial movement of the weight 2. The weight 2 is movably supported on the casing 1 through a pair of slide bars 6a and 6b that prevent the rotation of the weight 2 about the axis G of inertial movement thereof. Reference numeral 72 denotes an additional adjustment screw.

According to the present invention, the casing 1 has a lid fitting recess 18 as an opening which allows the weight 2, the firing pin 4 and the latch lever 3 to be inserted into the casing 1 when they are incorporated into predetermined positions. The casing 1 further has shaft support grooves 13, each of which is open at an end thereof that faces the recess 18. In the embodiment, the support pins 30 and 50, which form the axes P and Q of rotation, are fitted into and supported by the shaft support grooves 13 and 150 (see FIG. 2, described below), respectively.

Figure 2:
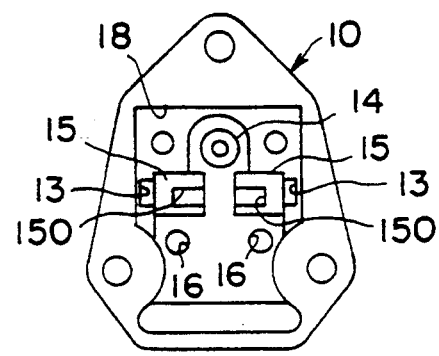
FIG. 2 is a front elevational view showing the internal structure of a casing body in the sensor of the embodiment.
Figure 3:
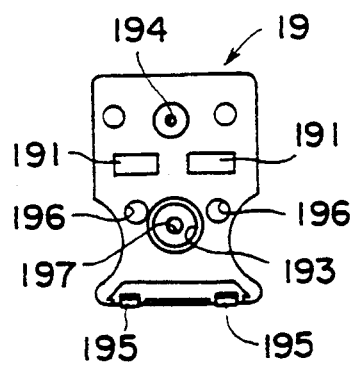
FIG. 3 is a rear elevational view showing the structure of the reverse side of a lid in the sensor of the embodiment.

The details of the arrangement of the sensor will be explained below more specifically with reference to FIGS. 1 to 3. (Although the positional relationships will be explained below on the assumption that the direction of the percussive action of the firing pin 4 is the forward direction for the sake of convenience, it should be noted that the set-up configuration of the sensor is not limited to forward percussive action). First of all, the casing 1 has a body 10 and a lid 19. The lid 19 closes the front open end of the body 10 and also functions as a holder. The body 10 is a plastic molding in the form of a cylinder, the forward end of which is open. An outwardly extending plate-like flange 11 is provided on the forward end of the body 10 and constitutes a mounting flange for attaching the casing 1 to a housing 90 (see FIG. 6), as described below. The flange 11 has three screw receiving holes for attaching the casing 1 to the housing 90. The flange 11 is further formed with a lid fitting recess 18 having a shape complementary to the external shape of the lid 19 at a position surrounded by the three screw receiving holes. In addition, the boundary between the recess 18 and the bottom wall of the body 10 is formed with a pair of attachment holes 17 corresponding to attachment lugs 195 formed on the lid 19.

The rear end wall of the body 10 is formed with a pair of support holes 16 for supporting the respective rear ends of the slide bars 6a and 6b. The rear end wall of the body 10 is further formed with a forwardly extending tubular flange 14 that supports the rear end of the firing pin 4 at the inner periphery thereof and that guides the rear end of the firing spring 41 at the outer periphery thereof, and a pair of forwardly extending support blocks 15 having support grooves 150 for supporting two ends, respectively, of the support pin 50 for the sub-lever 5. Two mutually opposing side walls of the body 10 are respectively formed with support grooves 13, the forward ends of which are open to support two ends of the support pin 30 for the latch lever 3. The bottom wall of the body 10 is formed with a pair of longitudinally spaced adjustment screw holes 101 and 102 (see FIG. 4, described below).

The lid 19 has a stepped hole 194 extending through it for receiving the firing pin 4. The stepped hole 194 has an enlarged-diameter portion at its outwardly facing forward end thereof, which faces toward the housing 90. The lid 19 is also formed with a pair of left and right slide bar support holes 196, a set screw hole 197, a spring seat hole 193 which is contiguous the screw hole 197, and a pair of screw receiving holes for fastening the lid 19 to the body 10. In addition, the lid 19 is provided with a pair of rearwardly extending retaining projections 191 which are respectively received in the support grooves 13 of the body 10 to retain the peripheral surface of the support pin 30 by the concave cylindrical surfaces at the distal ends thereof.

The weight 2 is in the shape of a prism, two side surfaces of which are complementary to the side wall inner surfaces of the casing body 10 with a predetermined clearance maintained between the weight and the casing body. The weight 2 has a centrally located groove 21 that extends along the front face, the top face and partway down the rear face and receives the latch lever 3 and the sub-lever 5. Cut-away portions are provided at the forward and rear ends of the upper portion of the weight 2 in order to avoid interference with the support pins 30 and 50 for the latch lever 3 and the sub-lever 5. The weight 2 is formed with a slide bar receiving hole 22 and a slide bar fitting groove 24, which extend longitudinally through the weight 2. The lower side of the weight 2 is formed with a groove 23 (see FIG. 4) of trapezoidal cross-section which has sloping front and rear walls.

The slide bar 6a is a circular cylindrical shaft, the outer diameter of which has a predetermined fit tolerance with respect to the guide hole 22 in the weight 2 so that the slide bar 6a is closely fitted in guided relationship with the hole 22, which has a circular cross-section. The slide bar 6b is also a circular cylindrical shaft similar to the slide bar 6a. However, the slide bar 6b is loosely fitted in the guide groove 24 in the weight 2. More specifically, the fitting clearance between the guide groove 24 and the slide bar 6b is close in the center portion and gradually enlarged along the direction of inertial movement of the weight 2. The enlargement of the clearance allows the weight to slide freely, even though the two guide bars may not be precisely parallel because of manufacturing deviations. The reason why the guide groove 24 is enlarged in diameter toward each of the longitudinal ends is to make the arrangement conformable to the design of the sensor which enables the direction of inertial movement of the weight 2 to be set in either the forward or backward directions or in both directions.

The latch lever 3 is L-shaped, having a pair of arms, and the bent portion of the latch lever 3 has a hole that receives the support pin 30 so that the latch lever 3 is rotatable about the pin 30. The portion of one arm that faces the spring seat hole 193 is formed with a projection 31 for positioning the arm-side end portion of a set spring 33. The rear side of this portion of the arm is formed with a projection 32 which faces the front side of the weight 2. The distal end of the other arm is formed with an involute tooth 34. A roller 35, which functions as a bearing, is supported through a pin 36 in a cut portion formed in the center of the upper portion of the distal end of the arm.

The sub-lever 5 is similarly formed in an L-shape, having a pair of arms, and the bent portion of the sublever 5 receives the support pin 50 so that the sublever 5 is rotatable about the pin 50. The front side of one arm is formed with a projection 51 which faces the rear side of the weight 2. The distal end of the other arm is formed with an involute tooth 52 which is meshed with the involute tooth 34 formed at the distal end of one arm of the latch lever 3.

The firing pin 4 is sharpened at the forward end thereof in order to provide a concentrated point of impact against a percussion cap 912 (see FIG. 6, described below). The center of the firing pin 4 is formed with a collar 40 that serves as a portion for engagement with the latch lever 3 and also serves as a spring seat. The front side of the collar 40 is reduced in diameter to define a step for engagement by the outer peripheral surface of the roller 35. The rear side of the collar 40 is reduced in diameter to constitute a spring seat for a firing spring 41.

As shown in FIG. 4A, the components of the sensor are incorporated into the body 10, for example, in the following procedure. First, the support pin 50 is inserted into the sub-lever 5, and both ends of the pin 50 are fitted into the respective grooves 150 formed in the rear wall of the body 10, thereby supporting the sub-lever 5 in the innermost part of the body 10. Next, the weight 2, which has the slide bars 6a and 6b respectively inserted into the slide bar receiving hole 22 and the slide bar fitting groove 24, is fitted into the body 10. At this time, since the external shape of the weight 2 and the internal shape of the body 10 are complementary to each other, the distal ends of the guide bars 6a and 6b are readily fitted into the pair of support holes 16, respectively, which are formed in the rear wall of the body 10. Thus, the weight 2 is positioned at one end thereof. Next, the support pin 30 is inserted into the latch lever 3, and both ends of the pin 30 are fitted into the pair of support grooves 13, respectively, which are formed in the mutually opposing side walls of the body 10, thereby incorporating the latch lever 3 into the body 10. At this time, the two involute teeth 34 and 52 are meshed with each other, as a matter of course.

Meantime, at any time during the above-described assembling procedure, the firing spring 41 is inserted into the body 10, and one end thereof is fitted into the tubular flange 14. Next, the firing pin 4 is inserted into the firing spring 41. Thus, the incorporation of all the members is completed. Then, the lid 19 is pushed into the lid fitting recess 18 of the body 1 with the members positioned such that the forward end of the firing pin 4 fits into the stepped hole 194 in the lid 19 and the forward end of the set spring 33 fits into the spring seat hole 193. At this time, the forward ends of the pair of slide bars 6a and 6b automatically fit into the respective slide bar support holes 196 in the lid 19, and the pair of attachment lugs 195 are engaged with the respective attachment holes 17. Finally, a pair of set screws are screwed into the lid 19, thereby completing the assembly.

The sensor arranged as described above can be set in any of three different operating configurations according to the acceleration sensing direction selected. When the sensor is to be set in a common operating condition, in which it is adapted to operate in response to only negative acceleration (deceleration), a setting procedure as shown in FIG. 4B is followed. First, the adjustment screw 71 is tightened with a predetermined level of torque by using a torque driver or the like. Consequently, the roller 35 is correctly positioned with respect to the step portion of the collar 40 of the firing pin 4. In this state, the adjustment screw 72, which has been screwed into the adjustment screw hole 101, is tightened by using a torque driver or the like. Consequently, the sloping surface portion of the groove 23 of the weight 2 is engaged by the inner end of the adjustment screw 72, causing the weight 2 to be moved into engagement with the latch lever 3. As a result, the clearance between the weight and latch lever is eliminated, and the weight 2 is set in position without play. Finally, the adjustment screw 71 is removed, and thus the setting is completed. Thus, all the settings of the sensor can be effected simply by controlling the torque externally applied by a screwing operation without the need for visual observation.

When the sensor is to be set so as to be capable of operating in response to both acceleration and deceleration, the adjustment screw 72 is removed in the above-described set condition. In this set condition, the sensor operates not only when excessive deceleration acts on the sensor at the time of a front-end collision or other similar accident but also when excessive acceleration acts thereon due to a rear-end collision or other similar accident. In the meantime, the acceleration sensing direction can be matched with the set position of the sensor regardless of whether it is set to face forward or backward. In such a case, the acceleration sensing direction can be set by determining which one of the pair of adjustment screw holes 101 and 102 of the casing 1 should be selected to be engaged with the adjustment screw 72.

Figure 6:
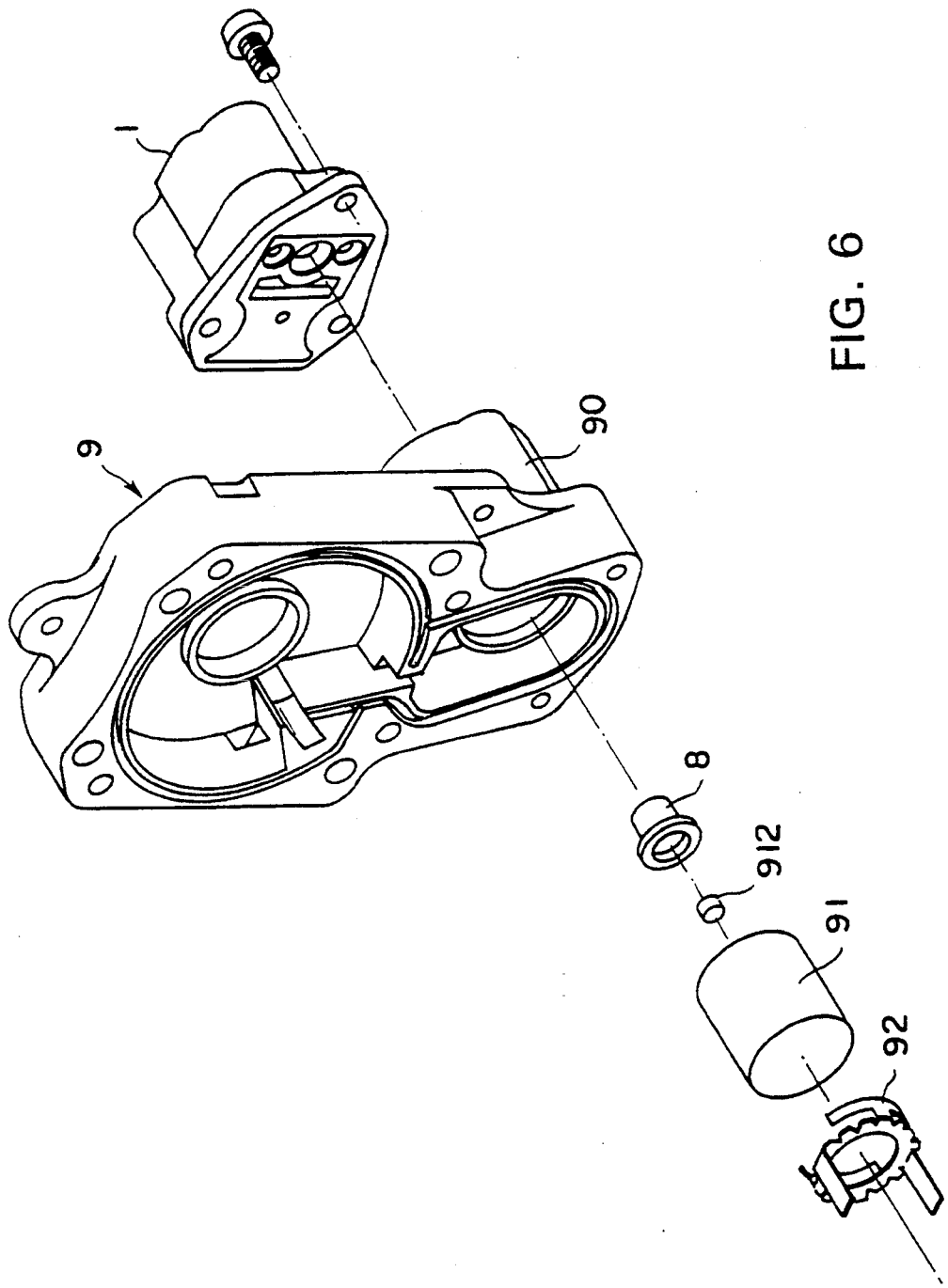
FIG. 6 is an exploded perspective view showing the way in which the sensor of the embodiment is assembled into a pretensioner.

Further, the sensor can be installed in an orientation which is established by properly rotating it about the axis of movement of the weight 2 or the firing pin 4, as shown in FIG. 6. This capability of the sensor is a result of the fact that since the rotation of the weight 2 about the axis of movement thereof is prevented by the pair of slide bars 6a and 6b the latch lever 3 and the weight 2 will not interfere with each other during the operation despite the complicated arrangement of the latch lever 3 and the weight 2. The elimination of the restriction on the set-up configuration is mainly useful to increase the degree of freedom for orientation in which a retractor equipped with the sensor can be installed on a vehicle. It is also possible to set up the sensor with the longitudinal axis thereof vertically inclined at a predetermined angle with respect to that of the sensor installed in the normal set-up configuration. This capability of the sensor is obtained mainly due to the fact that the weight 2 is set in position without play so that no impact load will be applied to the latch lever 3 from the weight 2. The reduction in the limitation on the set-up configuration can be used most effectively when a retractor equipped with the sensor is installed with an inclination in conformity to the inclination of the pillar of the vehicle.

FIG. 6 shows the positional relationship between the sensor, arranged as described above, and a pretensioner 9 when the former is attached to the latter. The sensor is attached to the pretensioner 9 by securing the casing 1 thereof to a housing 90 of the pretensioner 9 by using screws, and it is connected to a gas generator 91 which is accommodated in the housing 90 and fastened at the forward end thereof by a snap ring 92. Reference numeral 8 denotes a coupler seal interposed in the joint between the housing 90 and the casing 1 to prevent leakage of a gas, which is generated when the gas generator 91 is activated, to the outside of the joint. Reference numeral 912 denotes a percussion cap buried at the rear of the gas generator 91.

FIG. 5A to 5C show the operation of the sensor. When the sensor is in an inoperative state, the weight 2 is in the position shown in FIG. 5A. When excessive acceleration acts on the sensor, the weight 2 moves forward as shown in FIG. 5B by inertia. The motion of the weight 2 causes the latch lever 3 to rotate about the support pin 30, disengaging the roller 35 from the collar 40. Consequently, the firing pin 4 is percussively pushed out by the force of the firing spring 41, as shown in FIG. 5C. The percussive firing action of the firing pin 4 causes the percussion cap 912 to be fired, which in turn causes the propellant in the gas generator 91 to be ignited to generate a gas. In this way, the supply of gas to the pretensioner is effected.

In the sensor of the above-described embodiment, the support pins 30 and 50 are each supported at both ends by respective grooves, which are open toward the opening of the casing body 10, that is, toward the lid fitting recess 18. On the other hand, the firing pin 4 and the slide bars 6a and 6b are each supported at one end by the casing body 10 and at the other end by a hole formed in the lid 19. Accordingly, assembly of the constituent elements can be completed by incorporating them into the body 10 only in a single-axis direction and fitting the lid 19 in the same direction. Moreover, the casing body 10 can be produced nearly completely by molding except for machining required to form some portions such as the adjustment screw holes. In addition, since the cross-sectional configuration of the weight 2 is complementary to the interior configuration of the casing body 1, the set-up position of the weight 2 can be automatically matched to the body 1 simply by inserting the weight 2 into the body 1. In addition, as the weight 2 is incorporated into the body 1, the distal ends of the slide bars 6a and 6b align with the respective holes 16 and fit into them without the need of a particular positioning operation. Thus, the constituent elements can be incorporated substantially automatically except for some positioning which is needed to mesh the involute teeth 34 and 52 of the two levers 3 and 5.

Although the present invention has been presented above by way of one embodiment in which the present invention is used to activate a pretensioner in a seat belt system, the present invention is not limited to the described embodiment but is also applicable, for example, to an inflator in an air bag system without changing the basic arrangement thereof. Further, various changes and modifications may be made to the specific arrangement without departing from the scope of the invention, which is set forth in the appended claim.

Although in the foregoing embodiment only the levers are arranged as rotary elements such that the shafts thereof are supported by the grooves, the present invention includes an arrangement in which the weight, the firing pin and other additional elements are adapted to rotate about respective support shafts, and all or some of the shafts are supported by grooves in the casing.

I claim:

1. In a mechanical acceleration sensor having a sensor casing, a weight member, a firing pin member biassed by a spring, and a latch lever member, at least one of said members being movably mounted in the sensor casing in such a manner as to translate along a first axis and at least another of said members being movably mounted in the sensor casing in such a manner as to rotate about a second axis, the second axis being substantially perpendicular to the first axis, and the latch lever member being loaded with a predetermined biasing load to engage the firing pin member and being positioned to be engaged by the weight member upon inertial movement of the weight member to disengage from the firing pin member, thereby allowing the firing pin member to perform a percussive firing action by a force generated by the spring, the improvement wherein the casing has a single opening for receiving the weight member, firing pin member and latch lever member, shaft support grooves are provided in the casing such that each shaft support groove is open at an end thereof which faces the opening, and a shaft for said another member that rotates is supported by the shaft support grooves.

2. The improvement according to claim 1 wherein the shaft has opposite end portions, each of the end portions of the shaft is received in one of the shaft support grooves, and the shaft support grooves are substantially parallel to each other and perpendicular to the shaft.

3. The improvement according to claim 1 wherein the shaft support grooves are located on opposite walls of the casing proximate to opposite edges of the opening.

* * * * *